United States Patent
Specht et al.

(10) Patent No.: US 11,011,902 B2
(45) Date of Patent: May 18, 2021

(54) LINE CONNECTOR, ELECTRICAL LINE ASSEMBLY AND PRODUCTION PROCESS FOR AN ELECTRICAL CONNECTION

(71) Applicant: Lisa Draexlmaier GmbH, Vilsbiburg (DE)

(72) Inventors: Klaus Specht, Geisenhausen (DE); Christoph Forstmeier, Landshut (DE); Christoph Goetzmann, Vilsbiburg (DE)

(73) Assignee: Lisa Draexlmaier GmbH, Vilsbiburg (DE)

(*) Notice: Subject to any disclaimer, the term of this patent is extended or adjusted under 35 U.S.C. 154(b) by 0 days.

(21) Appl. No.: 16/227,294

(22) Filed: Dec. 20, 2018

(65) Prior Publication Data

US 2019/0199079 A1    Jun. 27, 2019

(30) Foreign Application Priority Data

Dec. 27, 2017  (DE) .................... 10 2017 131 352.4

(51) Int. Cl.
*H01R 4/18* (2006.01)
*H02G 15/18* (2006.01)
(Continued)

(52) U.S. Cl.
CPC ............ *H02G 15/18* (2013.01); *H01R 4/186* (2013.01); *H01R 4/187* (2013.01); *H01R 4/20* (2013.01); *H01R 4/625* (2013.01); *H01R 43/0249* (2013.01); *H01R 43/048* (2013.01); *H02G 1/14* (2013.01); *H01R 11/32* (2013.01)

(58) Field of Classification Search
CPC ......... H01R 4/186; H01R 4/187; H01R 4/20; H01R 4/203; H01R 43/0249; H01R 9/038; H01R 9/0506; H01R 9/0518; H01R 13/62–62994; H01R 4/625; H01R 4/023; H01R 4/12; H01R 4/16; H01R 43/048; H01R 43/02; H01R 43/0207;
(Continued)

(56) References Cited

U.S. PATENT DOCUMENTS

| 3,001,000 A * | 9/1961 | Wantz, Jr. ................ H01R 4/00 174/71 R |
| 3,134,844 A * | 5/1964 | Myers .................... H01R 4/186 174/94 R |

(Continued)

FOREIGN PATENT DOCUMENTS

| DE | 2723029 | 11/1978 |
| DE | 102005039462 | 3/2007 |

(Continued)

*Primary Examiner* — Roshn K Varghese
(74) *Attorney, Agent, or Firm* — Burris Law, PLLC (57) ABSTRACT

The present disclosure pertains to a line connector for permanently connecting two or more electrical lines, with at least one metallic receiving sleeve which partially accommodates one of the lines, which exhibits at least a first through-opening as well as a second through-opening for introducing a welding tool or for introducing the lines, and at least a second compression section located between the through-openings, in which the receiving sleeve can be radially compressed. Furthermore, the present disclosure pertains to an electrical line assembly as well as a process for connecting two or more electrical lines.

12 Claims, 6 Drawing Sheets

(51) Int. Cl.
*H02G 1/14* (2006.01)
*H01R 43/048* (2006.01)
*H01R 43/02* (2006.01)
*H01R 4/62* (2006.01)
*H01R 4/20* (2006.01)
*H01R 11/32* (2006.01)

(58) Field of Classification Search
CPC .... H01R 2201/26; H01R 11/12; H01R 11/32; H02G 15/18; H02G 15/14
USPC .................................................. 174/84 C, 92
See application file for complete search history.

(56) References Cited

U.S. PATENT DOCUMENTS

| | | | | |
|---|---|---|---|---|
| 3,387,080 | A * | 6/1968 | Dibble | H01R 4/186 |
| | | | | 174/94 R |
| 5,423,474 | A * | 6/1995 | Kanagawa | H01R 4/2495 |
| | | | | 228/110.1 |
| 6,538,203 | B1 | 3/2003 | Nölle et al. | |
| 7,438,597 | B1 | 10/2008 | Scea et al. | |
| 7,909,647 | B2 * | 3/2011 | Kawaguchi | H01R 9/035 |
| | | | | 439/585 |
| 8,348,699 | B2 * | 1/2013 | Nagawatari | H01R 13/6589 |
| | | | | 439/607.01 |
| 10,167,927 | B2 * | 1/2019 | Cawood | F16G 11/02 |
| 10,312,605 | B2 * | 6/2019 | Hamada | H01R 9/0518 |
| 2006/0189184 | A1 * | 8/2006 | Onuma | H01R 4/64 |
| | | | | 439/98 |
| 2009/0068890 | A1 * | 3/2009 | Horiuchi | H01R 4/20 |
| | | | | 439/607.41 |
| 2009/0218134 | A1 * | 9/2009 | Stroh | H01R 4/187 |
| | | | | 174/74 R |
| 2010/0175906 | A1 | 7/2010 | Takayama | |
| 2014/0144015 | A1 * | 5/2014 | Mayer | H01R 4/20 |
| | | | | 29/860 |
| 2015/0229115 | A1 * | 8/2015 | George | H02G 15/117 |
| | | | | 174/72 A |
| 2016/0006138 | A1 * | 1/2016 | Harms | B23K 11/0026 |
| | | | | 174/74 A |
| 2019/0165492 | A1 * | 5/2019 | Warashina | H01R 4/187 |
| 2019/0165493 | A1 * | 5/2019 | Warashina | H01R 4/187 |

FOREIGN PATENT DOCUMENTS

| | | |
|---|---|---|
| DE | 102013013151 | 2/2015 |
| DE | 102014002643 | 8/2015 |
| GB | 1536163 | 12/1978 |
| WO | 2012022763 | 4/2012 |

* cited by examiner

LINE CONNECTOR, ELECTRICAL LINE ASSEMBLY AND PRODUCTION PROCESS FOR AN ELECTRICAL CONNECTION

CROSS-REFERENCE TO RELATED APPLICATIONS

This application claims priority to and the benefit of DE 10 2017 131 352.4 filed on Dec. 27, 2017. The disclosure of the above application is incorporated herein by reference.

FIELD

The present disclosure pertains to a line connector suitable for distributing electrical power to multiple lines. Furthermore, the present disclosure pertains to an electrical line assembly with (one such) line connector as well as to a process for establishing an electrical connection between multiple lines.

BACKGROUND

The statements in this section merely provide background information related to the present disclosure and may not constitute prior art.

A connection between two or more electrical lines in which the electrical conductors are materially connected to a transit node or end node is known, for example, from WO 2012/022763 A3. An ultrasonic welding process is used to connect the lines, the welding quality of which is mainly influenced by the machine parameters of the ultrasonic welding apparatus used. The disadvantage here is that the welding quality in ultrasonic welding can be influenced by, in addition to the machine parameters, the material surfaces of the components to be welded, i.e. the electrical lines, or by environmental factors, which cannot be sufficiently monitored throughout the process. Furthermore, it is disadvantageous that the sound waves generated during ultrasonic welding can also be transmitted to components adjacent to the components to be welded, and cause damage there.

One conceivable alternative to ultrasonic welding, however which does not produce a material bond, is crimping. This is only conditionally suitable for aluminum lines, however, as the marked creeping behavior of the aluminum can lead to a loosening of the connection and the surface oxidation layer has an electrically insulating effect.

SUMMARY

Generally, the present disclosure provides an improved way of materially connecting two or more electrical lines using a structurally simple means.

The present disclosure is based on the idea of electrically connecting two, three, four, or more electrical lines, and in one form round and/or in strands in cross-section, in that the lines are partially received by receiving sleeves of a common line connector and at least partially materially connected to them. This connection can be, for example, a transit node or end node.

For this purpose, the line connector according to the present disclosure provides for the non-detachable connection of two or more electrical lines is made, in one form, of an electrically conductive metal and has at least one metal receiving sleeve which receives a section of the lines. Additionally, the receiving sleeve exhibits a first through-opening for insertion of the respective line as well as a second through-opening for insertion of a welding tool. In this case, the line connector can be galvanized either in whole or in part, plasma-coated, or painted. It is also conceivable that the line connector can be a component of a bus bar of an electrical power distributor in the electrical system of a motor vehicle. Additionally, the line connector can be encapsulated within a synthetic material, in order to achieve electrical insulation to the outside or protection against mechanical influences.

This configuration according to the present disclosure yields multiple advantageous effects. Thus, the receiving sleeve allows a material connection by means of friction welding, wherein the material connection thereby created can be visually inspected through the second through-opening. It can also facilitate the creation of a distributor or splice system with simple constructive elements. By means of (contact) friction welding, depending upon the design variant, the following material combinations can advantageously be connected with electrochemical compatibility: A copper line with a copper receiving sleeve, an aluminum line with a copper receiving sleeve, and an aluminum line with an aluminum sleeve.

One advantageous design of the present disclosure provides that at least one receiving sleeve exhibits at least one third through-opening, the hole axis of which is aligned transversely to the hole axis of the first and/or second through-opening. Thus, a bundle with multiple lines can be introduced at an angle through the first and second through-openings such that their exposed leads are located in the area of the third through-opening. The welding tool can be inserted through the third through-opening, in order to plasticize at least the ends of the lines.

For example, if bundles of lines with larger diameters are to be completely welded, it can be advantageous if at least one receiving sleeve exhibits a fourth through-opening, the hole axis of which is aligned transversely to the hole axis of the first and/or second through-opening. Thus, the lines can be divided into at least two bundles and then plasticized from multiple sides, thereby achieving a high-quality weld.

In a particularly advantageous design of the present disclosure, the line connector may exhibit two or more receiving sleeves, which are connected to one another via at least one electrically conductive connecting section. The two or more receiving sleeves can be arranged side by side, in one form in at least one row, so that the longitudinal axes of the receiving sleeves are aligned parallel to one another. As only a single line is placed inside each receiving sleeve in one form of the present disclosure, different material combinations are easy to implement, without regard to their position in the electrochemical voltage series.

Another advantageous design of the present disclosure provides that the inner diameter of a first receiving sleeve differs from the inner diameter of a second receiving sleeve. In other words, the receiving sleeve can exhibit varying inner diameters individually or in groups, so that different line cross-sections can be electrically connected to one another with a single line connector.

It has also proven to be advantageous if at least one of the receiving sleeves tapers in from the first through-opening to the second through-opening. This can also be accomplished by means of a step. As a result, the cable stripped of insulation on its longitudinal end can on the one hand be clamped on its insulation, and on the other hand planar contact between the exposed conductor and the receiving sleeve can be made.

For pre-fixing the line within the receiving sleeve, for implementing strain-relief or for attachment by clamping, at least one of the receiving sleeves can have a clamping element projecting into the receiving sleeve, at least in sections. This clamping element can be formed from the metal of the receiving sleeve, for example, or be affixed there with adhesive tape, a type of sealant, or other similar means.

The line connector can be provided particularly cost-effectively and technically simply if the connecting section is formed as a sheet.

In order to fasten the line connector, especially together with the lines, to a support piece, for example in a power distributor in a motor vehicle, the connecting section can exhibit a fastening element for connecting to a support piece. In the simplest case, the fastening element can be a through-opening, whereby the line connector can then be fastened in the manner of a cable lug, for example to a contact bolt. The electrical connection to the electrical lines can then be made via the contact bolt.

For even simpler assembly, the line connector may exhibit two essentially complementary shell elements. This makes it possible, for example, for the respective line with exposed conductor to be placed on or in one shell element and then enclosed by another shell element from the other side. It also allows the longitudinal axis of the line to extend away from the line connector at an angle to the longitudinal axis of the receiving sleeve.

The shell elements can be connected to one another via a coupling element located in the connecting section. This can be achieved, for example, by clinching, gluing, or other such means. Alternatively, the shell elements can be materially connected to one another by a welding process, either simultaneously by welding the respective line to its receiving sleeve or in a separate welding operation.

In a multi-part line connector, for the purpose of sealing the receiving sleeves, a sealing element can be affixed to at least one flat side of the receiving sleeve of one of the shell elements, arranged such that it abuts with the other shell element. The sealing element can be designed as adhesive tape, a fluid sealant, a fusible or foaming sealant, hot melt, etc.

In order to provide protection against overcurrent, in particular when distributing electrical current between the individual lines, the connecting section can have at least one safety fuse, such as a fusible wire located within a housing. In this case, the connecting section may consist entirely of the fusible wire and if applicable, the housing.

The present disclosure also pertains to an electrical line assembly, which in one form has at least one line connector in one or more of the previously described design variants. The line assembly has multiple electrical lines and a line connector which has at least one receiving sleeve which is open at least on its ends, in which the lines can be at least partially inserted and bonded with a material connection.

The line assembly offers the advantage that current can be distributed via the line connector and/or via the lines which are connected therein, i.e. a transit node or end node can be formed. Nevertheless, an ultrasonic welding process is unnecessary, as the individual lines are located in a respective receiving sleeve and can be welded through the frontal opening, especially by means of friction welding. This makes it possible to achieve a higher weld quality, while simultaneously significantly lowering the technical outlay for production and assembly and allowing for visual inspection of the weld.

To achieve a kind of stress relief, the insulating jacket of the respective line can be radially clamped by a projecting clamp element in the interior of the receiving sleeve. For this purpose, grooves or other projections can be formed on the inner wall of the receiving sleeve.

Alternatively, a separately manufactured and/or designed section of the insulating jacket can be attached to the receiving sleeve, which can exhibit at least one through-opening. This separate section may be made of metal, a polymer material, or ceramic. In other words, the section of insulating jacket can be designed as an insert and can be made of a different material than the receiving sleeve.

The present disclosure also pertains to a process for producing an electrical connection between two or more electrical lines. The process is particularly suitable for producing the previously described line assembly and comprises the following steps:

A line connector with at least one receiving sleeve is provided, which are electrically connected to one another via at least one connecting section. Thus, the line connector allows for power distribution to multiple lines, whereby in some design forms the current can be fed through the connecting section.

Then a respective line or possibly an exposed conductor is partially inserted into an associated receiving sleeve.

The lines inserted into at least one receiving sleeve are then, in one form, radially compressed, in that the receiving sleeve has a pressing force applied from the outside.

Then the respective line is joined with the receiving sleeve materially, ideally without the use of ultrasound, by means of a friction welding tool, which is guided to the line through at least one of the through-openings of at least one of the receiving sleeves and then rotated relative to the line. Here at least portions of the inner wall of the receiving sleeve are materially connected to the exposed, compressed lines.

Optionally, a visual inspection of the weld between the receiving sleeve and the line can then be performed, for which the receiving sleeve may ideally exhibit the aforementioned through-opening on its end.

The process thus offers the advantage that the technical complexity of connecting multiple lines can be significantly reduced. Especially if the welding process can be conducted without the use of ultrasound, the weld quality can be well monitored, for example through the end opening. This also eliminates the possibility of damage to adjacent components by ultrasound.

A particularly advantageous design of the present disclosure provides that the material connection is achieved by a friction welding tool, which is guided to the line through a through-opening on the respective receiving sleeve, brought into direct contact if desired, and then rotated relative to the line. The friction welding tool can be, for example, a mandrel-like tool, as is known for friction stir welding. The optional visual inspection of the welded connection can also be made through the same through-opening.

In order that especially the exposed conductor of the respective line has good contact on an inner surface of the receiving sleeve, that the line is pre-fixed within the receiving sleeve, or that the material connection is more easily facilitated, the receiving sleeve can be compressed radially, and in one form, along the whole circumference of the receiving sleeve, before or during the material connection to the line inside it. In this case, the pressing tool can also exert a force on the receiving sleeve during, for example, the friction welding process, in order to inhibit the line from rotating with the tool.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
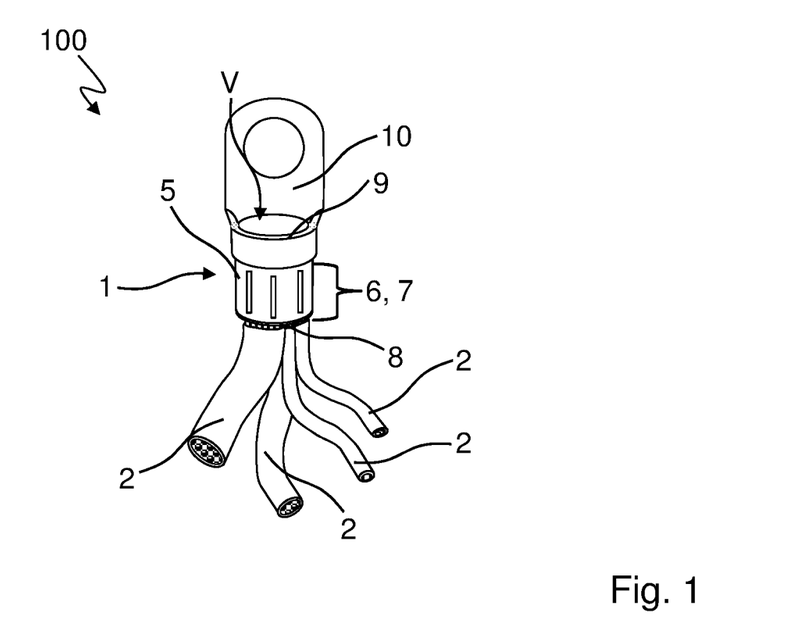
FIG. 1 is a first design example of a line assembly according to the present disclosure, with a line connector according to the present disclosure shown in a perspective view.

FIG. 1 shows a perspective side view of a first design example of an electrical line assembly 100, which exhibits a line connector 1 according to a first design example as well as multiple—in this case, four for example—electrical lines 2 affixed hereto, for example in the form of stranded cables. The line assembly 100 is particularly suited for transit connectors or end connectors, as used in motor vehicles for example. From a functional perspective, the electrical conductors 4 of the lines 2, surrounded by an insulating jacket 3, are electrically connected on one side to the common line connector 1 and on the other side to the respective electrical load (not shown).

The line connector 1 shown in FIG. 1 is sleeve-like in shape and forms a receiving sleeve 5 on its inside, here a hollow cylinder, into which the individual lines 2 are arranged together and thereby bundled together. In other words, the lines 2 within the receiving sleeve 5 form a joint connection node. The receiving sleeve 5 can be structurally, but also functionally, divided into a compression section 6 as well as an insulating jacket section 7. In the compression section 6, the receiving sleeve 5 is compressed radially, whereby the lines 2, which within the compression section 6 are, in one form, stripped of their insulating jacket 3, are compressed with the receiving sleeve 5. Additionally, the lines 2 mainly within the compression section 6 are welded to an inner surface of the receiving sleeve 5 and/or to one another. In the insulating jacket section 7, however, no welding takes place, since it is ideal that the heat of the friction welding process, which is described in greater detail below, does not reach this area.

The receiving sleeve 5 has on one end a first through-opening 8 and on the opposite end a second through-opening 9, wherein the lines 2 in this design example are guided from the first through-opening 8 through the receiving sleeve 5, such that the line ends therein are essentially even with each other and adjacent to the second through-opening 9. In the already-welded state shown here, the resulting welded connection V can be seen through the second through-opening 9 and can thus be inspected for weld quality with optical means, such as a camera system. Additionally, the line connector 1 and the receiving sleeve 5, in this example adjacent to the second through-opening 9, exhibit a single-piece electrical contact element 10 which projects beyond the respective end and, like a cable lug, can be affixed to a support element (not shown), such as a body panel of a motor vehicle, for an electrical connection. The line connector 1 is also affixed mechanically (friction and/or material connection) to the support element via the contact element 10.

Figure 2:
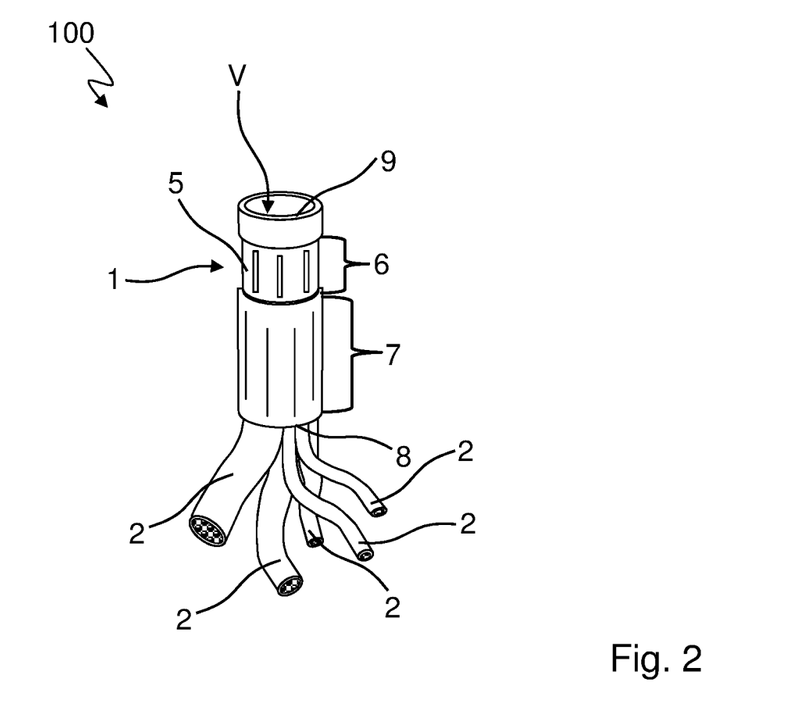
FIG. 2 is another design example of a line assembly according to the present disclosure, with a line connector according to the present disclosure shown in a perspective view.

FIG. 2 shows another design example of the electrical line assembly 100, which differs mainly from the previous example in that the insulating jacket section 7 is longer and exhibits a larger inside diameter in comparison to the compression section 6. Additionally, the contact element 10 is not explicitly shown here, as it is not required in every application. However, the welded connection V can also be optically inspected through the second through-opening 9 in this case.

In this design example the insulating jacket section 7 also serves as a strain relieving element for the single insulated line 2 in the line assembly 100. These jacket sections can also be compressed with insulation 3 in the receiving sleeve 7 in the insulating jacket section 7. This area 7 can also be used on the back side for media-tight sealing of the stripped conductors 4 and of the welded connection V in the direction of the lines 2. Furthermore, the insulating jacket section 7 can be designed as a separate component made of metal, polymer material, or ceramic.

Figure 3:
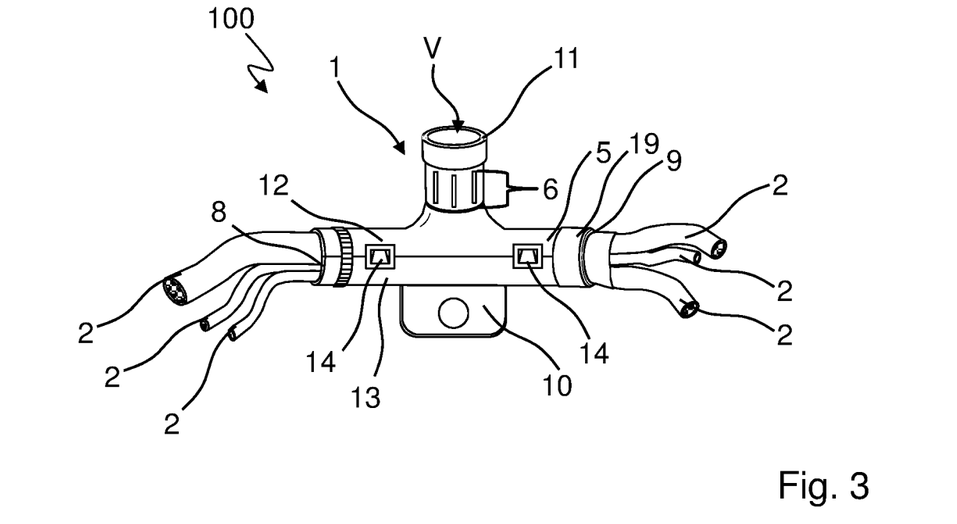
FIG. 3 is another design example of a line assembly according to the present disclosure, with a line connector according to the present disclosure, shown in a perspective view.

FIG. 3 shows another design example of the line assembly 100, in which the line connector 1 exhibits an additional, third through-opening 11, the hole axis of which is positioned transversely to the (here common) hole axis of the first and second through-opening 8, 9. In this design example, the hole axes are arranged perpendicular to each other, whereby the third through-opening 11 is located between the first and second through-openings 8, 9. From a functional perspective, the first and second through-opening 8, 9 differ from the previously described design examples, as here the welded connection V is not made through the second through-opening 9, but rather transversely to it through the third through-opening 11. However, the welded connection V can also be optically inspected through the third through-opening 11.

From FIG. 3 it is also evident that the contact element 10 in this design example, again similar to a cable lug, is located opposite the third through-opening 11 and extends away from it in the opposite direction. Additionally, the line connector in this design example is designed as multiple components and correspondingly exhibits two complementary shell elements 12, 13 which are connected to each other via at least one (here a total of two, as an example) coupling element 14. The coupling element 14 is configured here as a clip, for example, such that the shell elements 12, 13 are arranged around the lines 2 to be connected, and then simply compressed and thereby connected to them. The connection of the shell elements 12, 13 can also be achieved by means of winding tape, adhesive tape, shrink tubing, or cable ties.

The shell elements 12, 13 can be designed as separate components affixed to the receiving sleeve 5 and made of metal, polymer, or ceramic.

Figure 4:
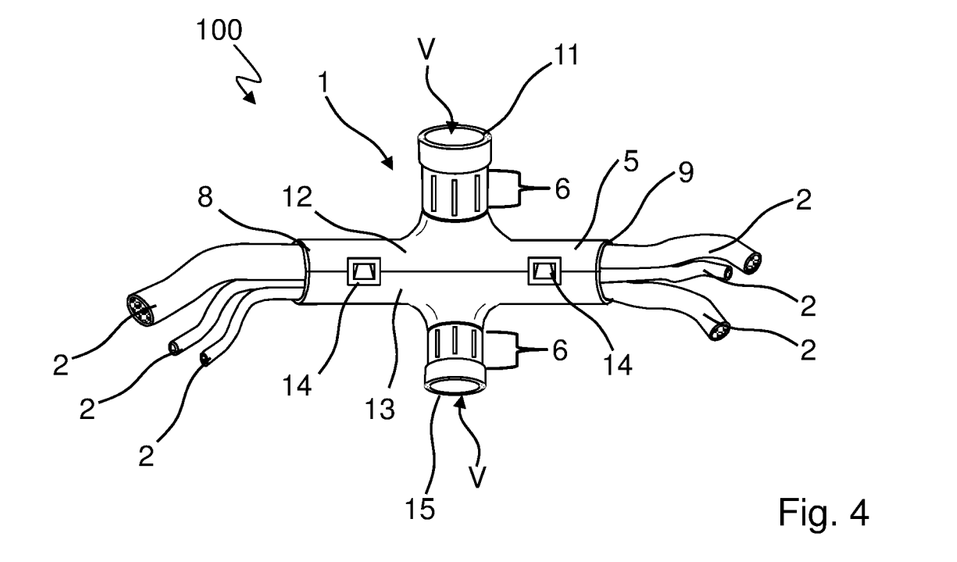
FIG. 4 is another design example of a line assembly according to the present disclosure, with a line connector according to the present disclosure, shown in a perspective view.

FIG. 4 shows a further design example of the line assembly 100, in which an additional, fourth through-opening 15 is located, which is opposite the third through-opening 11 here. This is especially advantageous if the bundle of lines 2 exhibits such a large diameter that it is divided into two bundles in order to achieve a higher weld quality of the welded connection V to be created through the third and fourth through-openings 11, 15 by plasticizing the components to be welded from two radially opposing sides. For the purpose of affixing the line connector 1 to a support piece, a hidden side fastening tab, such as the contact element 10 or a similar element, can be provided here.

The welded connections V of the two through-openings 11, 15 are designed here such that in the compression section 6 of the through-opening 11, only lines with an electrical conductor 4 of aluminum are welded and in through-opening 15 only lines 2 with electrical conductors of copper are welded.

Figure 5:
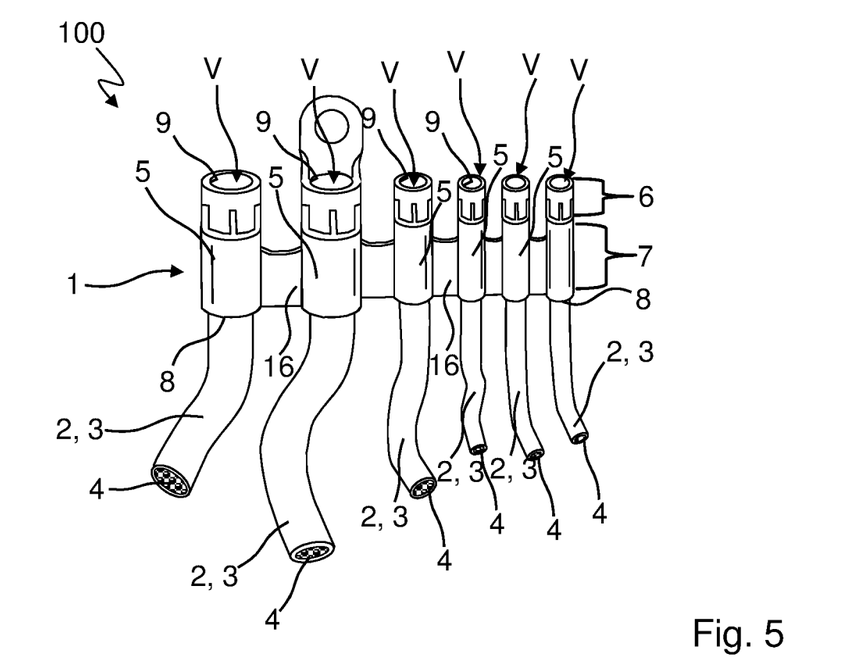
FIG. 5 is another design example of a line assembly according to the present disclosure, with a line connector according to the present disclosure, shown in a perspective view.

The line connector 1 of the design example shown in FIG. 5 is designed here as a stamped/bent component, here additionally shown as one piece for example, and has a number of individual receiving sleeves 5 which corresponds to the number of lines 2, the inner diameters of which are slightly larger than the outer diameter of the conductor 4 or the insulating jacket 3 which is to be inserted into them. The receiving sleeves 5 here have varying inner diameters for varying diameters of lines, although this is merely optional/exemplary. In the receiving sleeves 5, the compression section 6 is at least partially tapered with respect to the insulating jacket section 7. In the compression section 6 (in FIG. 5 above), as in the design examples described above, the exposed conductors 4 are again welded to the receiving sleeves 5, or rather to their inner surface, whereby additional compression can be provided here.

The respective receiving sleeves 5 are electrically connected to one another via a corresponding number of connecting sections 16, wherein the connecting sections 16, especially in this design example, are sheet-shaped and designed as a single component with the receiving sleeves 5. The sheet material chosen for this application is electrically conductive, so that the receiving sleeves 5 are electrically connected via the connecting sections 16.

As can be seen from FIG. 5, in each case a free end of each respective line 2, on which the conductor 4 is partially exposed, is inserted into the respective receiving sleeve 5, for which the respective receiving sleeve 5 in turn exhibits a first through-opening 8 (in FIG. 5 below). On the opposing side the respective receiving sleeve 5 also exhibits the (in FIG. 5 above) second through-opening 9, which serves to allow introduction of the welding tool, as is detailed further below.

The electrical contact element 10 in the form of a cable lug is located adjacent to or at the second through-opening 9, here on one of the receiving sleeves 5 as an example and is either formed as a single component with the receiving sleeve 5, or welded to it, as is further described below.

Figure 6:
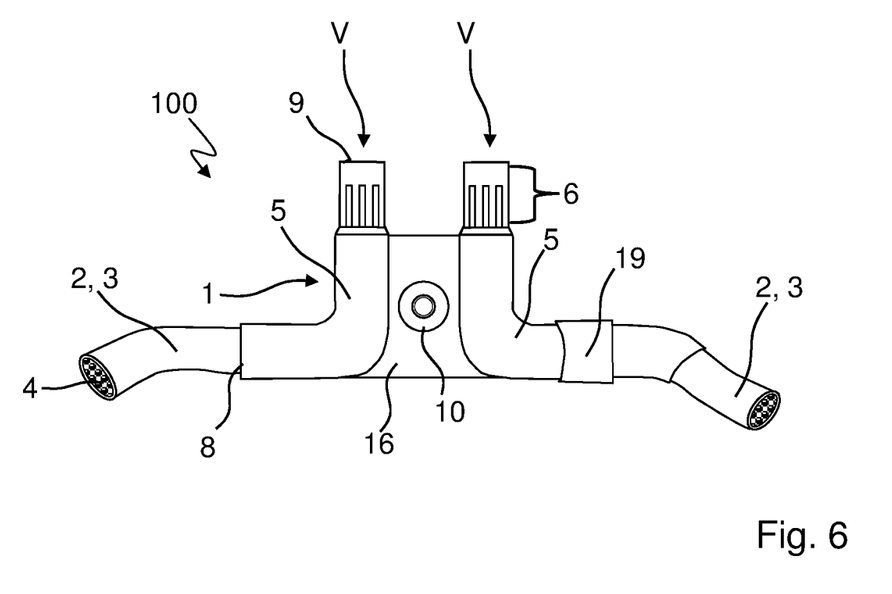
FIG. 6 is another design example of a line assembly according to the present disclosure as well as a line connector according to the present disclosure, shown in a side view.

FIG. 6 depicts a design variant of the line connector 1 in which the lines 2 are directed away from the receiving sleeves 5 at an angle. For this purpose, the receiving sleeves 5 themselves are angled so that the hole axes of the first and second through-openings 8, 9 do not share a common longitudinal sleeve axis, but rather are angled in relation to each other, for example in a rectangular manner. Here, two receiving sleeves 5 are shown as an example, however more than two receiving sleeves 5 may be provided in this design variant. FIG. 6 also shows, however, that a design variant of the contact/fastening element 10 is located in the connecting section 16 for electrical connection to an electrical counter-element or carrier element (not shown and not further detailed). The fastening element 10 exhibits a through-hole as well as a threaded bolt inserted through it, again similar to a cable lug. The fastening element 10 may also be a welded-on or pressed-in threaded bolt or nut.

The transitional area between the through-opening 8 of the curved sleeve element 5 and the electrical conductor 2 can be sealed against media ingress by means of shrink tubing 19.

Figure 7:
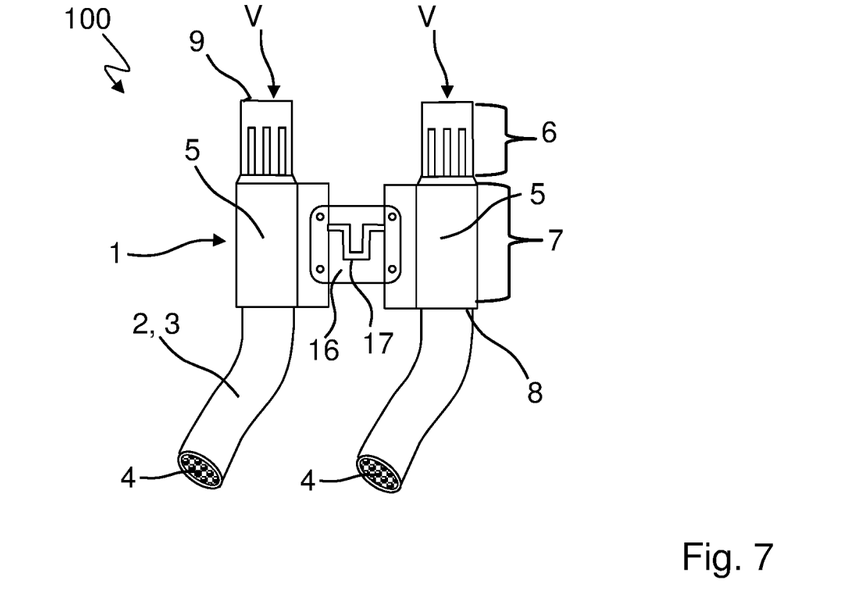
FIG. 7 is a line assembly according to the present disclosure equipped with a safety fuse with a line connector, shown in a side view.

In the design variant depicted in FIG. 7, the connecting section 16 exhibits a safety element 17 in the form of a safety fuse with a fusible wire electrically connecting the receiving sleeves 5 and is located in a recess between two receiving sleeves 5. The safety element 17 overlaps the side tabs of the receiving sleeves 5 and is affixed by means of clinching, for example.

Figure 8:
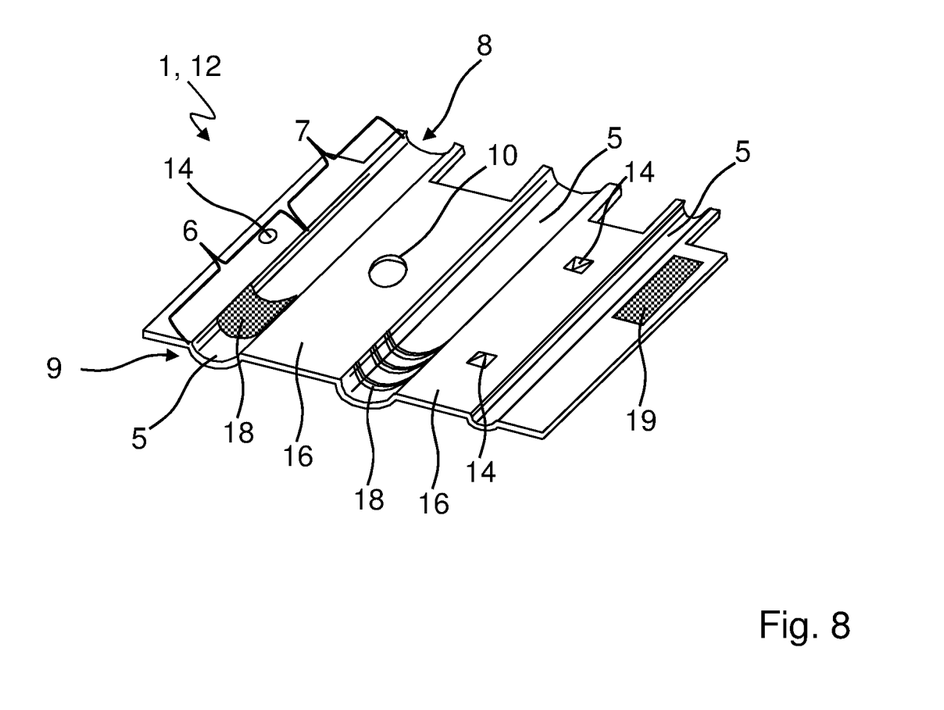
FIG. 8 is an exemplary shell element of a line connector according to the present disclosure, shown in a perspective view.

FIG. 8 illustrates a further, multi-component design variant of the line connector 1. This need not necessarily have a one-piece design, but rather this design example can correspondingly exhibit the two complementary shell elements 12, 13. FIG. 8 therefore illustrates a single shell element 12, which constitutes one half of the respective receiving sleeve 5. With the addition of another shell element 13, the result is, for example, the hollow cylindrical receiving sleeve 5. Adjacent to the second through-opening 9 of the receiving sleeve 5, the shell element 12 within the part of the receiving sleeve 5 has, for example, clamping and/or fastening elements 18 for making contact with the conductor 4, which is in one form, a stranded conductor. The clamping and/or fastening element 18 is, for example, a protruding ridge formed from the sheet material of the shell element 12, a band of adhesive tape, or similar. Furthermore, FIG. 8 also depicts again the fastening element 10, which is formed here as a simple through-opening. FIG. 8 also indicates how the two shell elements 12, 13 can be connected to one another. For this purpose, coupling elements 14 are provided within the connecting section 16, which mechanically join the shell elements 12, 13 to one another. This is achieved for example by means of gluing, clinching, clamping, etc. In order to inhibit the ingress of foreign bodies or moisture, a sealing element 19 is provided on a flat side at least in the side tabs of the line connector 1, which is then clamped between the two shell elements 12, 13, seals these, and if necessary, glues them together.

FIGS. 9 through 12 illustrate an example of a process for producing an electrical connection between the lines 2 or for producing the line assembly 100 with the aid of the line connector 1.

Figure 9:
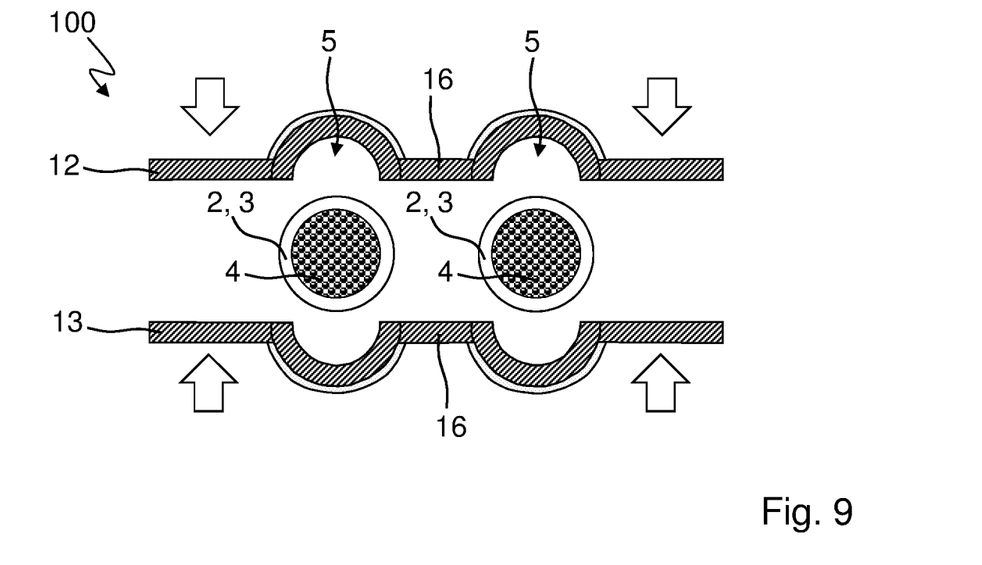
FIG. 9 illustrates two shell elements of a line connector according to the present disclosure, during a partial step of the production process of a line assembly according to the present disclosure, shown in a sectional top view.

First the conductors 4 of the lines 2, of which two are shown here as an example, are exposed by removing the insulating jacket 3. The conductors 4 are shown again here as stranded conductors.

In the case of a one-piece line connector 1 (see FIGS. 1, 2, and 5 for example), the lines 2 are inserted from the first through-opening 8 into the respective receiving sleeve 5 to a position just below the second through-opening 9.

In contrast, in the case of the multi-piece line connector 1, as shown in FIGS. 3, 4, 6, 8, and 9 for example, the shell elements are arranged around the ends of the lines and then assembled as is indicated by arrows in FIG. 9. Thus, the shell elements 12, 13 come together from opposite sides such that the ends of the exposed conductors 4, analogous to the one-piece variant, are adjacent to the second through-opening 9.

Figure 10:
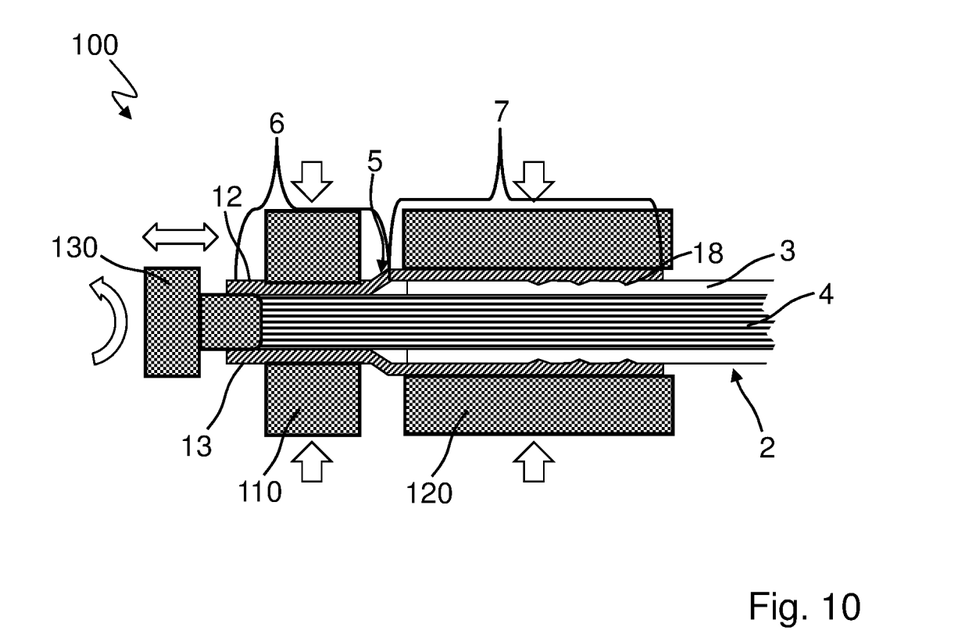
FIG. 10 illustrates partial steps of the production of a line assembly according to the present disclosure, shown in a sectional view.

As FIG. 10 shows, the receiving sleeves 5 are then radially compressed using a pressing tool with jaws 110, 120 in both the one-piece and multi-piece variants, as is shown by arrows in FIG. 10. In the compression section 6 (easier to recognize here), the exposed conductor 4 is brought into direct contact with the inner surface of the respective receiving sleeve 5. In the insulating jacket section 7, one or more clamping elements 18 in the form of projections protruding into the receiving sleeve 5 are engaged to the insulating jacket 3 by friction or material connections.

After compression, however, the pressing jaws 110, 120 secure the respective sections of the line connector 1 against rotation. Then a friction welding tool 130 is introduced to the second through-opening 9, as is once again indicated by an arrow in FIG. 10. The friction welding tool 130 which is partially inserted into the respective receiving sleeve 5 is then rotated relative to the clamped line connector 1 as well as the line 2, as is indicated in FIG. 10 by a corresponding arrow. The friction welding plasticizes the conductor material and/or at least partially the material of the receiving sleeve 5, so that a material bond V (see FIGS. 11 and 12) between the respective receiving sleeve 5 and the respective conductor 4 is achieved.

Figure 11:
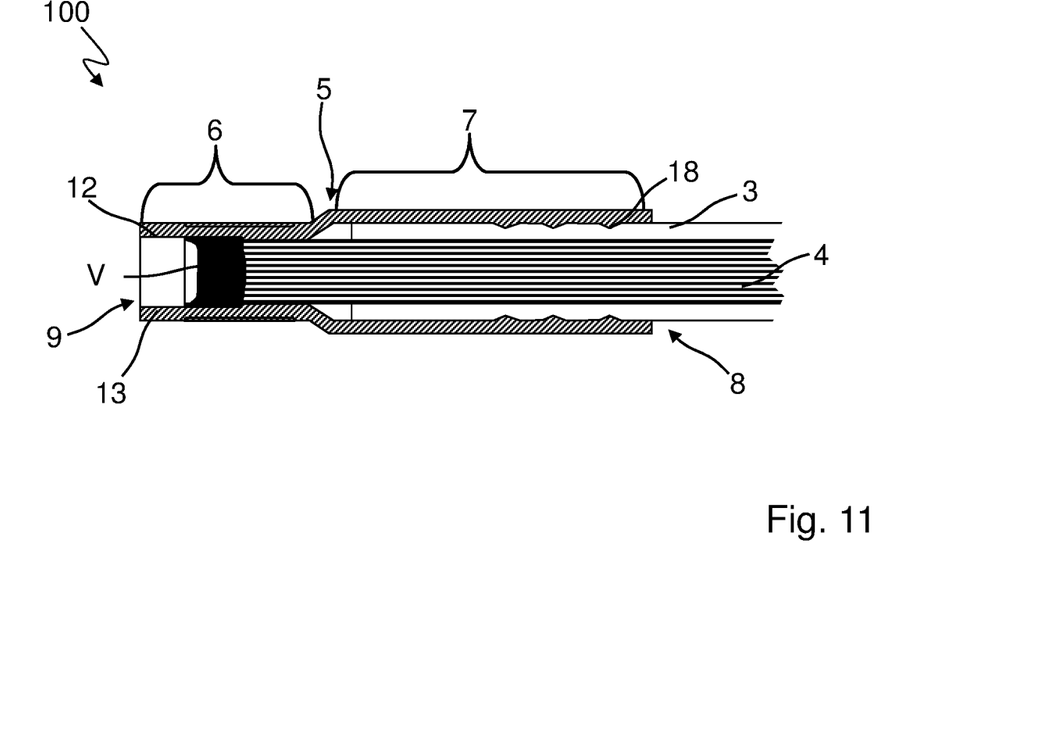
FIG. 11 is a line assembly according to the present disclosure with a line that is welded to a line connector, shown in a sectional view.

FIG. 11 shows the line assembly 100 produced in this way in a sectional view. After the material bond is achieved, the resulting welded connection V is optically inspected through the second through-opening 9 (on the left in FIG. 9), such as with the aid of a camera system.

Figure 12:
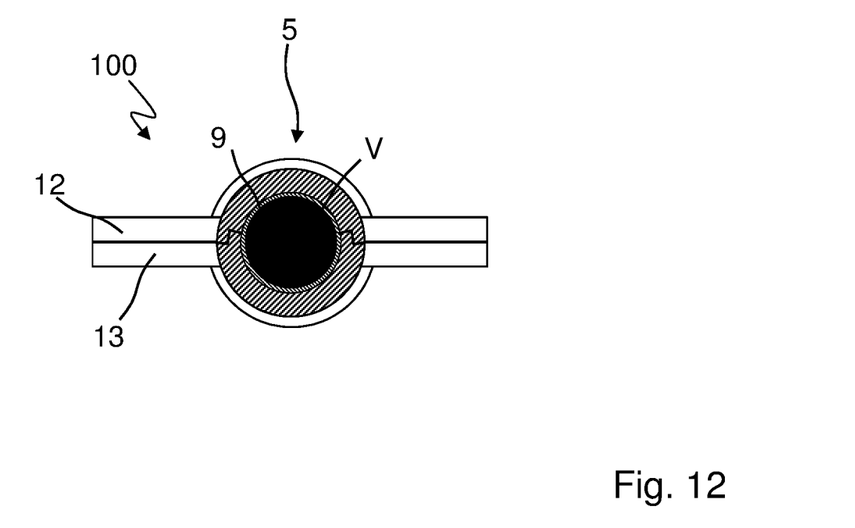
FIG. 12 is a partial section of a line assembly according to the present disclosure with two shell elements of a line connector according to the present disclosure.

Finally FIG. 12 shows the resulting line assembly 100 in a top view, wherein the material connection V is directly visible through the second through-opening 9. It can also be seen that the welding process with the friction welding tool 130 has also joined the first and second shell element 12, 13 into one element.

Furthermore, it is shown here that the receiving sleeves 5 of the shell elements 12, 13 are designed such that they are fitted to each other geometrically/in a form-fitting manner, and thus due to the welding of the conductors 4 to the receiving sleeve 5 in the compression section 6, a compression due to welding forces can be partially inhibited.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of" A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A line connector assembly for connecting two or more electrical lines comprising:
at least one metallic receiving sleeve defined by two complimentary shell elements; and
a plurality of electrical lines, each electrical line including conductors surrounded by an insulating jacket,
the at least one metallic receiving sleeve including one or more fastening elements comprising projections protruding into the at least one metallic receiving sleeve for making contact with the conductors,
the at least one metallic receiving sleeve partially accommodating the plurality of electrical lines and including at least a first through-opening and a second through-opening, wherein one of the first through-opening and the second through-opening is configured for introducing a friction welding tool,
the at least one metallic receiving sleeve having at least one compression section located between the first and second through-openings, in which the at least one metallic receiving sleeve can be radially compressed,
wherein the plurality of electrical lines are materially connected to the at least one metallic receiving sleeve by the friction welding tool to form a material weld such that the conductors and the at least one metallic receiving sleeve are plasticized.

2. The line connector according to claim 1, wherein the at least one metallic receiving sleeve includes a third through-opening having a hole axis aligned transversely to the hole axis of the first and/or second through-openings.

3. The line connector according to claim 2, wherein the at least one metallic receiving sleeve includes a fourth through-opening having a hole axis aligned transversely to the hole axis of the first and/or second through-openings.

4. The line connector according to claim 1 further comprising two or more metallic receiving sleeves connected to one another via at least one electrically conductive connecting section.

5. The line connector according to claim 4, wherein inner diameters of the two or more receiving sleeves are different.

6. The line connector according to claim 4, wherein the at least one electrically conductive connecting section has a sheet-like shape.

7. The line connector according to claim 4, wherein the at least one electrically conductive connecting section includes an electrical contact element.

8. The line connector according to claim 4, wherein the at least one electrically conductive connecting section exhibits at least one safety fuse.

9. The line connector according to claim 1, wherein the at least one metallic receiving sleeve tapers in from the first through-opening to the second through-opening.

10. The line connector according to claim 1, wherein the at least one metallic receiving sleeve includes a clamping element protruding inward.

11. The line connector according to claim 1, wherein the two complementary shell elements are connected via a coupling element, and further comprising two or more metallic receiving sleeves connected to one another via at least one electrically conductive connecting section, wherein the two complementary shell elements are located within the at least one electrically conductive connecting section.

12. The line connector according to claim 11, wherein a sealing element is located on at least one flat surface of the at least one electrically conductive connecting section of one of the shell elements.

* * * * *